United States Patent Office 3,000,927
Patented Sept. 19, 1961

3,000,927
TOXIC ARYLSULFINYL ALKENENITRILES
Gail H. Birum and Samuel Allen Heininger, Dayton, Ohio, assignors to Monsanto Chemical Company, St. Louis, Mo., a corporation of Delaware
No Drawing. Filed Dec. 31, 1957, Ser. No. 706,239
8 Claims. (Cl. 260—465)

This invention relates to novel arylsulfinyl alkenenitriles, to methods for the control of microorganisms using these nitriles and to certain novel compositions comprising these nitriles which inhibit the growth of microorganisms such as bacteria and fungi.

The novel compounds of the invention are arylsulfinyl alkenenitriles having the formula

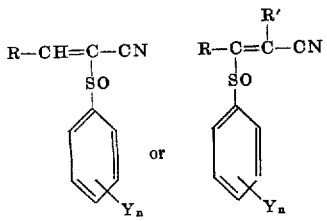

wherein R and R' are selected from the class consisting of hydrogen or hydrocarbon radicals free of aliphatic unsaturation and containing from 1 to 6 carbon atoms, and R and R' can be the same or different. The term "free of aliphatic unsaturation" includes aryl, alkyl and cycloalkyl radicals only, and by the term "free of aliphatic unsaturation" olefinic and acetylenic unsaturation is excluded. Y is selected from the class consisting of chlorine, bromine, iodine, fluorine, hydrogen and alkyl radicals having from 1 to 6 carbon atoms, and $n$ represents an integer from 1 to 5. An examination of each of these formulas above will indicate that the compounds can existing both the cis- and trans-isomeric forms. It is intended that both the cis- and trans- forms of each of these structures be covered by the above formulas.

It is an object of this invention to provide new compounds which are arylsulfinyl alkenenitriles.

It is another object of this invention to provide new and effective biological toxicant compositions which have as an active ingredient therein an arylsulfinyl alkenenitrile.

It is a further object of the invention to provide a method of inhibiting the growth of undesired microorganisms by the application of the inventive arylsulfinyl alkenenitriles to these microorganisms.

These and other objects of the invention will become apparent as a detailed description of the invention proceeds.

There are shown below a number of specific new compounds of the invention. It is not intended that this be a complete listing of all of the compounds of the invention, but that it merely be illustrative thereof. The following are a listing of a number of the arylsulfinyl alkenenitriles: 3-(phenylsulfinyl)acrylonitrile, 2-(phenylsulfinyl)acrylonitrile; 3-(2 - chlorophenylsulfinyl)acrylonitrile, 3-(3-chlorophenylsulfinyl)acrylonitrile, 3-(4 - chlorophenylsulfinyl)acrylonitrile, 2-(2 - chlorophenylsulfinyl)acrylonitrile, 2-(3-chlorophenylsulfinyl)acrylonitrile, 2-(4-chlorophenylsulfinyl)acrylonitrile; 3-(2,4 - dichlorophenylsulfinyl)acrylonitrile, 2-(2,4-dichlorophenylsulfinyl)acrylonitrile; 3-(pentachlorophenylsulfinyl)acrylonitrile, 2-(pentachlorophenylsulfinyl)acrylonitrile, etc.

An examination of the above-listed compounds only as to the nuclear substitution indicate that not every one of the possible novel compounds of the invention is named specifically. For example, only one of the dichloro isomers is named; no trichloro- and no tetrachloro-compounds are named. Nevertheless, it is intended to cover all these compounds as well as others covered by the general formula but not specifically named.

The following is a non-limiting listing of a number of the new bromoarylsulfinyl acrylonitriles: 3-(2-bromophenylsulfinyl)acrylonitrile, 3 - (3 - bromophenylsulfinyl)-acrylonitrile, 3-(4 - bromophenylsulfinyl)acrylonitrile, 2-(2-bromophenylsulfinyl)acrylonitrile, 2-(3-bromophenylsulfinyl)acrylonitrile, 2-(4-bromophenylsulfinyl)acrylonitrile; 3-(2,4-dibromophenylsulfinyl)acrylonitrile, 2-(2,4-bromophenylsulfinyl)acrylonitrile; 3-(pentabromophenylsulfinyl)acrylonitrile, 2-(pentabromophenylsulfinyl)acrylonitrile, etc.

It is also intended to cover under the general formula compounds containing both bromo- and chloro- substituents on the phenylsulfinyl group and the following are a non-limiting list thereof: 3-(2-bromo-4-chlorophenylsulfinyl)acrylonitrile, 2-(2,4 - dibromo-3-chlorophenylsulfinyl)acrylonitrile, etc.

Some of the novel compounds of the invention of the iodophenylsulfinyl acrylonitrile type are shown in the following non-limiting list: 3-(2-iodophenylsulfinyl)acrylonitrile, 2-(4-iodophenylsulfinyl)acrylonitrile, 3-(2,4-diiodophenylsulfinyl)acrylonitrile, 2-(3,4-diiodophenylsulfinyl)-acrylonitrile, 3-(2,3-diiodophenylsulfinyl)acrylonitrile, 2-(2-iodo-4-chlorophenylsulfinyl)acrylonitrile, etc.

For a non-limiting list of the fluorophenylsulfinyl acrylonitriles, the following are named: 3-(4-fluorophenylsulfinyl)acrylonitrile, 2-(2 - fluoro-3-iodo-4-chlorophenylsulfinyl)acrylonitrile, etc.

The alkylphenylsulfinyl acrylonitriles are shown specifically in the following non-limiting lists: 2-(4-tolylsulfinyl)acrylonitrile, 3-(3,5-diethylphenylsulfinyl)acrylonitrile, 2-(2-methyl-4-chlorophenylsulfinyl)acrylonitrile, 3 - (2,4-dichloro-5-ethylphenylsulfinyl)acrylonitrile, 2-(4-n-hexylphenylsulfinyl)acrylonitrile, etc.

Referring now to the general formulas above of the inventive compounds where R and R' are other than hydrogen, the following non-limiting list exemplary of compounds in which R or R' may be methyl, phenyl, ethyl, etc., is provided: 2-(4-chlorophenylsulfinyl)crotononitrile, 3-(2,4,5-trichlorophenylsulfinyl)cinnamonitrile, 3 - (4-tolylsulfinyl)-2-ethylacrylonitrile, 3-(4 - chlorophenylsulfinyl)-2-methylacrylonitrile, 3-(4 - chlorophenylsulfinyl)-2-cyclohexylacrylonitrile, etc.

Other compounds which are not covered by the general formula above but which can be prepared in a similar manner are the naphthylsulfinyl acrylonitriles, e.g., 2-(β-naphthylsulfinyl)acrylonitrile, 2-(β - chloro-α-naphthylsulfinyl)acrylonitrile, etc.

The novel compounds of the invention are normally prepared by dehydrohalogenation of the corresponding arylthio haloalkanenitriles and subsequent oxidation to the sulfoxide. The dehydrohalogenation is accomplished by heat and/or the employment of a basically acting material such as triethylamine, sodium or potassium hydroxide, pyridine, etc. to aid the dehydrohalogenation. Alternatively, the compounds can be prepared by dehydrohalogenation of the corresponding arylsulfinyl haloalkanenitriles. The arylsulfinyl haloalkanenitriles can be prepared by the controlled oxidation of the corresponding arylthio haloalkanenitrile using $H_2O_2$ in acetic acid, or fuming nitric acid in acetic anhydride, as described in detail in our copending application S.N. 706,238, filed of even date. The arylthio haloalkanenitriles can be readily prepared by a variety of methods including the addition of alkyl, halo-, or unsubstituted arylsulfinyl chlorides or bromides to acrylonitrile to give mixtures of the corresponding 3- or 2-halo-2- or 3-(phenylthio)propionitriles, the addition of alkyl- or halo-substituted thiophenols to α-haloacrylonitriles to give 2-halo-3-(phenylthio)propionitriles or by reaction of sodium or potassium alkyl- or halo-substituted thiophenolates with 2,3-dichloropropionitrile. Also other methods of preparation of these arylthio haloalkanenitriles will be obvious to those skilled in the art in view of the teachings herein.

Example 1

This is an example of the preparation of 3-(4-chlorophenylsulfinyl)acrylonitrile. In a two-liter flask was placed 289 grams (2.0 moles) of p-chlorothiophenol, and a solution of 80 grams (2 moles) of NaOH in 800 ml. of water was added while cooling the flask in an ice bath. Then over a period of two hours 247.5 grams (2 moles) of 2,3-dichloropropionitrile was added keeping the temperature at 15°–20° C. by cooling. The reaction mixture was stirred for one hour longer and then allowed to stand overnight. The product had solidified to small pellets. These pellets were filtered from the reaction mixture and were recrystallized from three liters of ethanol as fine white needles which melted at 42°–43° C. A total of 203 grams was recovered in the first crop of crystals. The filtrate was concentrated and diluted with water with the result that a second crop of 128 grams of crystals were recovered, M.P. 40°–41° C. Retreating of the filtrate gave a third crop of 32 grams of crystals. The total yield of product was therefor 363 grams, 78.3% yield. Considerable additional material remained in the mother liquor. Had the material been distilled, the yield would undoubtedly have been appreciably higher. The purified crystalline product had the following elemental analysis:

|  | Found | Calc'd for $C_9H_7Cl_2NS$ |
|---|---|---|
| Percent: |  |  |
| C | 47.2 | 46.6 |
| H | 2.9 | 3.0 |
| N | 5.7 | 6.0 |
| Cl | 30.4 | 30.5 |
| S | 14.1 | 13.8 |

This describes the dehydrochlorination of the product whose preparation is described in the paragraph immediately above. In a beaker there was placed 23.1 grams (0.1 mole) of 3-(4-chlorophenylthio)-2-chloropropionitrile prepared as described above. To the beaker was added 100 ml. of ether to dissolve the solid product therein, and 20.2 grams of triethylamine was added. At first no precipitate formed even heating on a steam bath and concentrating until all the ether was driven off. An additional 10 ml. of triethylamine was added and a solid precipitate formed, and ether was added to the contents of the beaker. The slurry was filtered to remove the solid matter and again the ether was evaporated from the filtrate. To the filtrate an additional 10 ml. of triethylamine was added giving a solid precipitate, and the filtering, washing and filtrate concentration steps were repeated. In this fashion in 5 separate treatments 11.0 grams of triethylamine hydrochloride were recovered which is 80% of theory. The dark red ether filtrate from the last treatment was poured into 500 ml. of hexane and heated to boiling to drive out the ether, then sodium sulfate and charcoal were added and the mixture heated for a few minutes on the steam bath. The mixture was then filtered through "Supercel" to give a clear, light yellow hexane solution. This solution was seeded with a small amount of the desired product and allowed to cool to room temperature, giving 1.1 grams of white needles having a melting point of 101°–102° C. as a first crop of crystals. The filtrate was warmed again to give complete solution and the same procedure repeated on the filtrate except that the filtrate was cooled in a water bath. The result was 1½ grams of crystals having a melting point 93°–95° C. A similar retreatment of the filtrate gave a 3rd crop of 2.1 grams of crystals having a melting point of 93°–96° C. A fourth crop of crystals was recovered in an amount of 7.2 grams, M.P. 68°–69° C. There still was a residue which did not crystallize but oiled out of the filtrate. The solvent was evaporated from the filtrate and Skellysolve was used instead of hexane. From this treatment of the filtrate an additional 4.4 grams of yellow crystalline solid was recovered and a black tarry residue remained after evaporating a solvent. The first two crops of crystals were combined since they contained most of the high melting crystalline material to give a total of 2.6 grams of this product. The last three crops of crystals were combined to give 13.7 grams of low melting point product. The total recovery was 83.3% or a yield of 13.3% of the high melting point product and 70% of the lower melting point product. The last three crops of crystals were combined lated this is 16% high melting point and 84% low melting point product. Before the fourth crop of crystals was combined with the third and fifth crops, a sample was taken of this fourth crop and recrystallized from Skellysolve to give a pure crystalline material, M.P. 68°–69° C. This pure lower melting point product had the following elemental analysis:

|  | Found | Calc'd for $C_9H_6ClNS$ |
|---|---|---|
| Percent: |  |  |
| C | 54.91 | 55.25 |
| H | 4.38 | 3.09 |
| N | 7.19 | 7.16 |
| Cl | 17.03 | 18.15 |
| S | 15.99 | 16.35 |

Contrary to conventional beliefs wherein the lower melting isomer is usually believed to be the cis-isomer, it is believed that this lower-melting isomer is in fact the trans-isomer. Although certain experimental evidence points in the direction we have indicated, we do not wish to be bound by this hypothesis.

We next describe the oxidation step to the sulfoxide. In a flask 10 ml. of acetic anhydride was cooled in an ice bath and 3.5 ml. of fuming nitric acid was slowly added thereto with stirring. This cold, colorless solution was then added in small portions over a 15 minute period to a cold solution of 9.8 grams of the lower melting point isomer consisting of the third, fourth and fifth crops of crystals produced as described above—this isomer being dissolved in 75 ml. of acetic anhydride. The solution was yellow most of the time during the nitric acid addition but turned a dark green afterwards. The mixture was then allowed to stand in an ice bath for three hours, after which time it was poured into one liter of ice water with the result that a yellow oil separated. On standing overnight a semi-crystalline mass was formed which had a red color. This crystalline mass was extracted with ether, the ether evaporated off and the residue redissolved in alcohol. To the alcohol solution was added some water and the crystals were allowed to grow. About 1.0 gram of thin yellow crystal plates, M.P. 70°–71° C. were recovered by filtration. This was not the desired product but is rather believed to be an undesirable disulfide by-product. All the solvent was removed and the residue was dissolved in a mixed solvent consisting of hexane and chloroform. The solvents were allowed to evaporate at room temperature over a period of several days and it was observed that crystals grew from the sides of the beaker as evaporation proceeded. When most of the solvent had evaporated the yellow crystals on the walls of the beaker were scraped off and removed from the oil which had settled out. The remaining liquid was decanted from the oils and on complete evaporation gave more of these yellow crystals. These yellow crystals were recombined and recrystallized from a small volume of methyl alcohol to give 0.5 grams of yellowish tiny needles, M.P. 101–102° C.—the crude crystalline product before recrystallization had a melting point of 95°–99° C. Applicant was surprised to find that this product had a melting point identical with the higher melting isomer of 3-(4-chlorophenylthio)acrylonitrile previously described. A mixed melting point between the sulfide and the anticipated sulfoxide of the same melting point gave a melting point of 75°–80° C., proving that these two compounds were definitely not the same. An elemental analysis of the sulfoxide product gave the following results:

| | Found | Calc'd for $C_9H_6ClNOS$ |
|---|---|---|
| Percent: | | |
| C | 50.92 | 51.1 |
| H | 2.69 | 2.9 |
| Cl | 16.67 | 16.8 |
| N | 6.81 | 6.6 |
| S | 15.25 | 15.1 |

An infrared analysis gave strong nitrile and sulfoxide bands. Since this product is believed to have been made from the transsulfide isomer it would be expected that the sulfoxide would also be the trans isomer, but we do not wish to be bound by this hypothesis and will merely claim it by melting point.

Alternatively the last two steps of making the sulfoxide may be reversed. That is, the 3-(p-chlorophenylthio)-2-chloropropionitrile may be oxidized to the sulfoxide by the method described above, then dehydrochlorinated to form the desired 3-(p-chlorophenylsulfinyl)acrylonitrile—the dehydrochlorination of the sulfoxide being carried out in the same manner as described above for the dehydrochlorination of the sulfide.

If instead of using p-chlorothiophenol as a basic raw material thiophenol is used, 3-(phenylsulfinyl)acrylonitrile is produced by the process of this example.

*Example 2*

This example illustrates the preparation of the cis- or higher melting isomer of 3-(4-chlorophenylsulfinyl)acrylonitrile.

In a beaker 20 grams of NaOH was placed and 200 ml. of water was added. After most of the sodium hydroxide had dissolved 72 grams (0.5 mole) of p-chlorothiophenol was added. Not all of this thiophenol went into solution so a few more pellets of sodium hydroxide were added, and the mixture was filtered. The cloudy filtrate was then added gradually over one hour to a well-stirred mixture of 62 grams (0.5 mole) of 2,3-dichloropropionitrile dissolved in 300 ml. of water. The reaction was mildly exothermic and the temperature was kept below 35° C. with cooling. The organic layer which separated was taken up in ether, water washed and dried over sodium sulfate. The solvent was evaporated and the residue distilled. Some decomposition occurred at the beginning of the distillation but soon stopped, and the distillation continued smoothly. First there were collected a few ml. of forerun, then 92 grams (79.5%) of a clear, light yellow product, $n_D^{25}$ 1.5898, B.P. 144–146° C./0.4 mm. was collected. Infrared testing of this product gives only slight nitrile band absorption indicating primarily 3-(4-chlorophenylthio)-2-chloropropionitrile. Further confirmation of this structure was indicated by oxidation to the sulfone and comparison by mixed melting point with this sulfone made in another manner. Also the refractive index is fairly close to that of the pure α-chloro isomer. The following is an elemental analysis of the product:

| | Found | Calc'd for $C_9H_7Cl_2NS$ |
|---|---|---|
| Percent: | | |
| C | 47.29 | 46.6 |
| H | 3.17 | 3.04 |
| Cl | 28.13 | 30.5 |
| N | 5.84 | 6.03 |
| S | 14.18 | 13.8 |

In a beaker was placed 23.2 grams (0.1 mole) of the 3-(4-chlorophenylthio)-2-chloropropionitrile prepared as described immediately above and this was dissolved in 200 ml. of ether. To the beaker was then added 10 grams of triethylamine. The solution became cloudy and a solid began to precipitate. The beaker was then placed on a steam bath and heated to expel the ether. The product was filtered to remove the amine salt and a dark brown oil filtrate remained. To obtain more material as a result of loss of some material in the first reaction, the above reactions were repeated using the same quantity of reactants. Again on the addition of the triethylamine, solid precipitated in the reaction mixture. The reaction mixture was filtered to remove the amine salt and heated on a steam bath. Additional ether was added and the reaction mixture again filtered. Two ml. of triethylamine was added and heated again to drive off all the ether. The solidified reaction mixture was diluted again with ether and filtered to remove the amine salt. After 4 such cycles collecting a total of 8.6 grams of the amine hydrochloride the filtrate was heated on a steam bath to remove the ether, then allowed to cool, resulting in the solidification of the residue. The solid was dissolved in boiling hexane leaving behind the red tar on decantation. The hexane solution was decolorized with "Norite" charcoal, cooled slowly, and yellowish-green needles crystallized out from the hexane solution. The dried crystals had a melting point of 63°–95° C., and were obviously a mixture of two materials. The total yield of crystals was 10.0 grams. Recrystallization of the crystalline material gave 2.0 grams of needlelike crystals having a melting point of 101°–102° C., and the following elemental analysis:

| | Found | Calc'd for $C_9H_6ClNS$ |
|---|---|---|
| Percent: | | |
| C | 55.38 | 55.25 |
| H | 3.11 | 3.09 |
| N | 7.06 | 7.16 |
| Cl | 17.92 | 18.15 |
| S | 16.42 | 16.35 |

Clearly this is the higher melting point isomer believed to be the cis isomer having the general structure 3-(4-chlorophenylthio)-acrylonitrile.

The mother liquor from which the above product was crystallized was then retreated by concentration and 2.4 grams of yellow needles crystallizing in a clump, M.P. 67°–69° C., were recovered. This material was recrystallized from hexane giving slightly off-white colored clumps of crystals, M.P. 68°–69° C. This is believed to be the lower melting or the trans isomer. A sample of this 68°–69° C. material was submitted for elemental analysis and gave the following results:

| | Found | Calc'd for $C_9H_6ClNS$ |
|---|---|---|
| Percent: | | |
| C | 55.71 | 55.25 |
| H | 3.19 | 3.09 |
| Cl | 18.87 | 18.15 |
| N | 6.77 | 7.16 |
| S | 16.42 | 16.35 |

The filtrates were combined and retreated to give an additional 6.4 grams of yellow-white crystals, M.P. 40°–70° C. obviously a crude mixture. Infrared reports of both the 68°–69° C. and the 101°–102° C. isomers have very similar curves, both showing 2220 wave length conjugated nitrile bands. The generally accepted theory assigns the trans isomer structure to the higher melting, least soluble isomer. However, as pointed out above there is other evidence available which indicates in this case that the lower melting isomer namely the 68°–69° C. isomer is the trans isomer, and the 101°–102° C. isomer is the cis isomer. However, as already indicated it has not been conclusively established that this is true, and the isomers will be claimed by melting point when trying to distinguish.

In exactly the same manner as that used in Example 1 to oxidize the 68°–69° C. isomer, the 101°–102° C. isomer is oxidized with fuming nitric acid in acetic anhydride to provide the desired sulfoxide of this high melting point isomer, which is believed to be cis isomer for reasons previously given. This isomer is then separated from the reaction mixture as described in Example 1.

Example 3

This example illustrates the preparation of 3-(4-chlorophenylsulfinyl)acrylonitrile using $H_2O_2$ as the oxidizing agent.

The sulfide is made in the following manner: To a solution of 45.3 grams (0.3 mole) of p-chlorothiophenol in 75 ml. of dioxane containing 5 ml. of 50% aqueous choline (2-hydroxy-ethyl trimethylammonium hydroxide) was added 26.3 grams (0.3 mole) of α-chloroacrylonitrile. There was immediate exothermic reaction during the addition, and the reaction mixture temperature was held at 35°–40° C. by cooling. After addition was complete the reaction mixture was stirred for one half hour at 30°–40° C., then poured into ice water. The oil which separated was extracted with ether, dried and the ether removed by evaporation. On distillation there was collected 55 grams (79% yield) of 3-(4-chlorophenylthio)-2-chloropropionitrile. The yellow liquid, B.P. 147°–148° C./0.6 mm., $n_D^{25}$ 1.5885, analyzing correctly for $C_9H_7Cl_2NS$, had an alphachloro structure by infrared analysis. On standing, the oil solidified, and a sample crystallized from ethanol had a melting point of 39°–40° C.

This describes the oxidation to the sulfoxide of this 39°–40° C. intermediate product. In a beaker was placed 5.8 grams (0.025 mole) of the 3-(4-chlorophenylthio)-2-chloropropionitrile prepared above. To it was added 20 ml. of glacial acetic acid and the mixture was heated until solution was obtained. Then at 50° C. addition was begun of 11.3 grams of 30% $H_2O_2$. No visible reaction occurred, i.e., it did not appear to be exothermic but after about ⅔ of the hydrogen peroxide had been added, an oil formed in the reaction mixture. Another 20 ml. of acetic acid was added giving solution again, and the addition of hydrogen peroxide was completed at 50°–60° C. The reaction mixture was kept at 50°–60° C. for one half hour, then the reaction mixture was warmed to 90° C. at which time a color began to develop. The reaction mixture was poured into ice water and allowed to stand overnight during which a white solid precipitated. The solid was filtered off and recrystallized from ethyl alcohol to give small white needles having a melting point of 109°–110° C. A second recrystallization from absolute alcohol gave material having a melting point of 111.5°–112° C., which had the following elemental analysis:

| | Found | Calc'd for $C_9H_7Cl_2NOS$ |
|---|---|---|
| Percent: | | |
| C | 43.04 | 43.5 |
| H | 3.14 | 2.84 |
| Cl | 27.67 | 28.6 |
| N | 5.61 | 5.64 |
| S | 12.53 | 12.9 |

This is the desired 3-(4-chlorophenylsulfinyl)-2-chloropropionitrile intermediate product.

The 3-(4-chlorophenylsulfinyl)-2-chloropropionitrile is then subjected to dehydrochlorination using triethylamine in a similar manner as that described in Example 1 for the dehydrochlorination step to produce the desired final product which is 3-(4-chlorophenylsulfinyl)acrylonitrile.

Alternatively steps 2 and 3 described above, i.e., the oxidation and the dehydrochlorination steps can be reversed in a similar manner to that described in Example 1 under the primary method of preparation. In the oxidation step to the sulfoxide, the nitric acid oxidizing agent of Example 1 will normally be preferred to the $H_2O_2$ oxidizing agent of this example, since the selective oxidation to the sulfoxide rather than the sulfone is much easier controlled with the nitric acid, and normally a purer product will result.

Example 4

This example illustrates the preparation of a mixture of 2-(4-chlorophenylsulfinyl)acrylonitrile and 3-(4-chlorophenylsulfinyl)acrylonitrile.

The sulfide intermediate product is made in the following manner: A mixture of 35.8 grams (0.2 mole) of p-chlorobenzene-sulfenyl chloride and 10.6 grams (0.2 mole) of acrylonitrile in 100 ml. of glacial acetic acid was refluxed for two hours. The color of the mixture turned from red to yellow in the first 15 minutes of reflux. Some HCl evolution will normally be observed in carrying out this reaction. After standing overnight at room temperature the reaction mixture was poured into 500 ml. of water to give a cloudy viscous orange oil. The oil was extracted with a mixture of equal volumes of benzene and hexane and the extract was washed with water until it was free of acid, and then the orange solution was distilled. After removal of the solvent there was obtained 28.7 grams of yellow viscous product, $n_D^{25}$ 1.5914, B.P. 180°–190° C./15 mm.

The product of this reaction of p-chlorobenzenesulfenyl chloride and acrylonitrile is a complex mixture containing probably 3 or 4 compounds. Infrared analysis of this mixture showed two nitrile bands. When the sulfide mixture was oxidized vigorously with $H_2O_2$, there was recovered a 30% yield of a sulfone, M.P. 92°–93° C. This sulfone was proved to be 3-(4-chlorophenylsulfonyl)-2-chloropropionitrile by comparison by a mixed melting point with the sulfone made by a different method. When forcing conditions in the oxidation were attempted dehydrohalogenation of the sulfone occurred and up to almost 20% yield of a chlorophenylsulfonyl acrylonitrile was obtained. As a result of these experiments it was concluded that the reaction mixture of acrylonitrile with p-chlorobenzenesulfenyl chloride consists of a mixture of primarily 2-(4-chlorophenylthio)-3-chloropropionitrile and 3-(4-chlorophenylthio)-2-chloropropionitrile together with 3- and/or 2-(4-chlorophenylthio)acrylonitrile. This method of producing specific sulfides is not particularly desirable except when a mixture is desired since the individual sulfides are difficult to separate.

A sample of 20 ml. of acetic anhydride is cooled to 10° C. and 7 ml. of fuming nitric acid is added with stirring. This solution is then added cautiously to 23.2 grams of p-chlorobenzene-sulfenyl chloride and acrylonitrile reaction product of this example, the reaction product having been previously dissolved in 100 ml. of acetic anhydride. The temperature of the reaction mixture is maintained during the addition of the oxidizing agent below 15° C. by the gradual addition and external cooling. The mixture is then allowed to stand for 3 hours at 10°–15° C. and poured into ice water. The crude sulfoxide is a mixture of sulfoxides containing 2-(4-chlorophenylsulfinyl)-3-chloropropionitrile as well as 3-(4-chlorophenylsulfinyl)-2-chloropropionitrile and dehydrochlorination products thereof. It is separated and purified by conventional means.

In a manner similar to that described in Example 1 above the mixture of sulfoxides is dehydrohalogenated using triethylamine to produce a mixture containing predominantly 2-(4-chlorophenylsulfinyl)acrylonitrile and 3-(4-chlorophenylsulfinyl)-acrylonitrile. These sulfoxides are difficult to separate but can be separated through conventional involved crystallization procedures and/or sublimation techniques.

Alternatively the mixture of 2-(4-chlorophenylthio)3- chloropropionitrile and 3-(4-chlorophenylthio)-2-chloropropionitrile can be first dehydrohalogenated using triethylamine, then the product 2-(4-chlorophenylthio)acrylonitrile and 3-(4-chlorophenylthio)acrylonitrile can be oxidized using fuming nitric acid in acetic anhydride to produce the desired unsaturated sulfoxides according to the procedure set forth in Example 1.

Example 5

This example describes the preparation of 3-(4-tolylsulfinyl)acrylonitrile.

To a solution of 27.8 grams of sodium hydroxide in 400 ml. of water was added 87 grams (0.7 mole) of 4-toluenethiol. This aqueous solution was then added to 86 grams (0.7 mole) of 2,3-dichloropropionitrile and the mixture stirred vigorously for 4 hours, with cooling to keep the temperature below 35° C. The product was extracted into ether, washed once with water, dried and the solvent removed. Distillation of the residue gave an 87% yield of a 4-tolylthiochloropropionitrile, B.P. 141°–144° C./1.2 mm., believed to be predominantly the α-chloro-β-tolylthio isomer. An elemental analysis gave the following results:

|          | Found | Calc'd for $C_{10}H_{10}ClNS$ |
|----------|-------|------------------------------|
| Percent: |       |                              |
| Cl       | 14.1  | 16.8                         |
| N        | 6.81  | 6.62                         |
| S        | 15.7  | 15.15                        |

The 3-(4-tolylthio)-2-chloropropionitrile prepared in this example is then dehydrochlorinated using triethylamine in a manner similar to that described in Example 1 to produce the corresponding 3-(4-tolylthio)acrylonitrile.

Also in a manner similar to that described in Example 1 the 3-(4-tolylthio)acrylonitrile is oxidized using nitric acid in acetic anhydride to produce the desired final product which is 3-(4-tolylsulfinyl)acrylonitrile.

Alternatively in a similar manner to that described in Example 1 the dehydrochlorination and oxidation steps can be reversed in order.

Example 6

This example illustrates the preparation of 3-(phenylsulfinyl)acrylonitrile.

3-(phenylthio)-2-chloropropionitrile was prepared by the choline-catalyzed addition of thiophenol to α-chloroacrylonitrile to give an 85% yield, B.P. 115°–116° C./0.3 mm., $n_D^{25}$ 1.5762. An elemental analysis of this product gave the following results:

|          | Found | Calc'd for $C_9H_8ClNS$ |
|----------|-------|-------------------------|
| Percent: |       |                         |
| C        | 55.29 | 54.7                    |
| H        | 4.1   | 4.1                     |
| Cl       | 17.4  | 18.0                    |
| N        | 6.74  | 7.1                     |
| S        | 16.8  | 16.2                    |

The 3-(phenylthio)-2-chloropropionitrile is then dehydrochlorinated using triethylamine in a manner similar to that described in Example 1 to produce the corresponding 3-(phenylthio)acrylonitrile.

Also in a manner similar to that described in Example 1 the 3-(phenylthio)acrylonitrile is oxidized using nitric acid in acetic anhydride to produce the desired final product which is 3-(phenylsulfinyl)acrylonitrile which is separated from the reaction mixture by conventional means such as crystallization and/or sublimation.

Alternatively as described in Example 1, the dehydrochlorination and oxidation steps can be reversed in order.

Example 7

This example illustrates the preparation of 2-(4-chlorophenylsulfinyl)acrylonitrile.

A mixture of 39.9 grams (0.2 mole) of 4-chlorophenylsulfinyl acrylonitrile (M.P. 167–168° C., prepared from sodium 4-chlorothiophenate and chloroacetonitrile followed by oxidation using fuming nitric acid in acetic anhydride), 6.0 grams of paraformaldehyde, 6 ml. of piperidine and 200 ml. of benzene is heated to reflux and the water evolved is collected in a Dean-Stark trap. After 5 hours of reflux the solution is concentrated under vacuum. To the residue is added 2.0 grams of phosphorous pentoxide and 0.5 gram of hydroquinone and the whole is subjected to a high temperature vacuum distillation of 0.5–2.0 mm. pressure to give a low yield of the desired monomeric 2-(4-chlorophenylsulfinyl)acrylonitrile.

Example 8

For evaluation of the bacteriostatic and fungistatic effects of these new compounds, the product of Example 1 was chosen, namely, the isomer 3-(4-chlorophenylsulfinyl)acrylonitrile having a melting point of 101°–102° C. This compound was mixed in predetermined concentrations with hot steril agar which was subsequently poured into Petri dishes, cooled, and allowed to harden. Nutrient agar containing the test compound was then inoculated with the bacteria *Micrococcus pyogenes* var. aureus and *Salmonella typhosa* and incubated for two days at 37° C.; and Sabouraud's dextrose agar containing the test compound was inoculated with the fungus organism *Aspergillus niger*, and incubated for 5 days at 20° C. These tests showed inhibition of the growth of the *Aspergillus niger* at down to 10 parts per million concentration of the test compound and inhibition of the growth of the *Micrococcus pyogenes* and the *Salmonella typhosa* down to 1 part per million concentration of the test compounds. Thus, it will be seen that these materials are very potent bacteriostats and fungistats. Usually these novel compounds will be applied as bacteriostats or fungistats at concentrations in the range of 0.0001% to 1.0%, preferably 0.001% to 0.1%, suspended, dispersed or dissolved in inert carriers.

The new compounds of this invention may be applied directly to microorganisms, the growth of which it is wished to inhibit, or they may be compounded in emulsion or in other forms with an inert carrier for application. The compounds of the invention may also be used as active ingredients in nematocidal, insecticidal, miticidal and herbicidal compositions and applications.

Although the invention has been described in terms of specified embodiments which are set forth in considerable detail, it should be understood that this is by way of illustration only and that the invention is not necessarily limited thereto, since alternative embodiments will become apparent to those skilled in the art in view of the disclosure. Accordingly, modifications are contemplated which can be made without departing from the spirit of the described invention.

What is claimed is:

1. An arylsulfinyl alkenenitrile selected from the class consisting of compounds of the formula

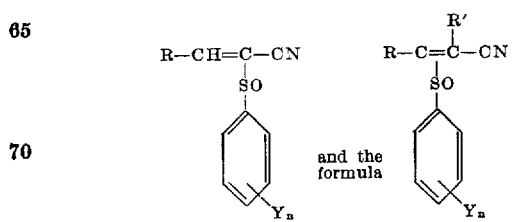

and the formula wherein R and R' are selected from the class consisting of hydrogen and hydrocarbon radicals free of aliphatic unsaturation and containing from 1 to 6 carbon atoms, Y is selected from the class consisting of chlorine, bromine, iodine, fluorine, hydrogen and alkyl radicals having from 1 to 6 carbon atoms, and $n$ is an integer from 1 to 5.

2. 2-(4-chlorophenylsulfinyl)acrylonitrile.

3. An arylsulfinyl alkenenitrile of the formula

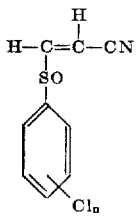

wherein $n$ is an integer from 0 to 2.

4. 3-(4-chlorophenylsulfinyl)acrylonitrile.

5. The 3-(4-chlorophenylsulfinyl)acrylonitrile isomer having a melting point of 101°–102° C.

6. 3-(phenylsulfinyl)acrylonitrile.

7. An arylsulfinyl alkenenitrile of the formula

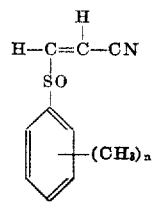

wherein $n$ is an integer from 0 to 2.

8. 3-(p-tolylsulfinyl)acrylonitrile.

References Cited in the file of this patent

UNITED STATES PATENTS

| | | |
|---|---|---|
| 2,174,568 | Davies | Oct. 3, 1939 |
| 2,671,798 | Chamberlin | Mar. 9, 1954 |
| 2,703,329 | Schultz | Mar. 1, 1955 |
| 2,843,519 | Fitch | July 15, 1958 |
| 2,844,505 | Miller | July 22, 1958 |
| 2,900,409 | Heininger et al. | Aug. 18, 1959 |

OTHER REFERENCES

Gillman: "Organic Chemistry," second edition, volume I, 1953, page 870.

UNITED STATES PATENT OFFICE
CERTIFICATE OF CORRECTION

Patent No. 3,000,927                    September 19, 1961

Gail H. Birum et al.

It is hereby certified that error appears in the above numbered patent requiring correction and that the said Letters Patent should read as corrected below.

Column 4, line 12, for "The last three crops of crystals were combined" read -- Figured on the ratio of crystalline product iso- --; column 7, line 8, for "meltng" read -- melting --; column 11, line 21, for "0 to 2" read -- 1 to 5 --

Signed and sealed this 17th day of April 1962.

(SEAL)
Attest:

ESTON G. JOHNSON

Attesting Officer

DAVID L. LADD

Commissioner of Patents